United States Patent [19]

Arbel

[11] Patent Number: 4,912,758

[45] Date of Patent: Mar. 27, 1990

[54] FULL-DUPLEX DIGITAL SPEAKERPHONE

[75] Inventor: Ygal Arbel, Sunnyvale, Calif.

[73] Assignee: International Business Machines Corporation, Santa Clara, Calif.

[21] Appl. No.: 263,115

[22] Filed: Oct. 26, 1988

[51] Int. Cl.[4] ............................................. H04M 1/60
[52] U.S. Cl. .................................... 379/388; 379/411
[58] Field of Search ............... 379/388, 389, 390, 387, 379/402, 406, 407, 410, 411

[56] References Cited

U.S. PATENT DOCUMENTS

| | | | |
|---|---|---|---|
| 3,751,602 | 8/1973 | Breeden | 379/389 |
| 4,113,997 | 9/1978 | Horna | 379/411 |
| 4,629,829 | 12/1986 | Puhl et al. | 379/58 |
| 4,636,586 | 1/1987 | Schiff | 379/390 |
| 4,649,505 | 3/1987 | Zinser, Jr. et al. | 379/411 |
| 4,741,018 | 4/1988 | Potratz et al. | 379/58 |
| 4,752,903 | 6/1988 | Iwata et al. | 364/724 |
| 4,757,527 | 7/1988 | Beniston et al. | 379/410 |
| 4,796,287 | 1/1989 | Reesor et al. | 379/390 |

OTHER PUBLICATIONS

"A/D and D/A Conversion System for A—Law Pulse Code Modulation" by A. Pel, IBM Technical Disclosure Bulletin, vol. 18, No. 8, Jan. 1976, pp. 2686–2688.
"Delta Modulation Coding with Nonuniform Adaptive Companding" by R. J. Hallett, et al., IBM Technical Disclosure Bulletin, vol. 22, No. 1, Jun. 1979, pp. 217–219.
"Voice Response for Data Processing Equipment" by G. L. Crauwels et al., IBM Technical Disclosure Bulletin, vol. 24, No. 11B, Apr. 1982, pp. 5890–5895.
"Overflow Control in Voice Coder" by C. Garland et al., IBM Technical Disclosure Bulletin, vol. 26, No. 10A, Mar. 1984, p. 5300.
"Full Duplex Speakerphone" by M. A. Einkauf et al., IBM Technical Disclosure Bulletin, vol. 29, No. 12, May 1987, pp. 5599–5602.
"Digital Speakerphones: Is Full—Duplex Possible" by Gary Kloesz, Business Communications, Jul. 13, 1987, pp. 36 & 40.

Primary Examiner—James L. Dwyer
Attorney, Agent, or Firm—Perman & Green

[57] ABSTRACT

A full-duplex digital speakerphone 10 includes a transmit signal path having an output coupled to a telephone trunk and a receive signal path having an input coupled to the telephone trunk and an output coupled to a loudspeaker. The speakerphone further includes a room echo cancellation adaptive filter 56 and a trunk echo cancellation adaptive filter 66. Serially coupled within the transmit signal path is a selective suppression block 50 for suppressing a component of a Mu-Law or an A-Law quantization error signal. A second selective suppression block 52 is serially coupled within the receive signal path. Suppression of non-linearities due to Mu-Law or A-Law signal conversion is also accommodated by providing a non-linear signal processing block 40 at an input to an adaptive filter and an optional non-linear signal processing block at an output of the adaptive filter. Each of the blocks emulates and compensates for signal converter non-linearity. The speakerphone facilitates adaptive filter coefficient initialization by beginning a call in a half-duplex mode and switching to full-duplex when filter coefficients are adapted. The speakerphone also has a variable adaptation step size which is a function of a short-term estimate of signal power within the associated transmit or receive signal paths.

25 Claims, 3 Drawing Sheets

FULL-DUPLEX DIGITAL SPEAKERPHONE

FIELD OF THE INVENTION

This invention relates generally to telephony apparatus and, in particular, to a full duplex digital speakerphone.

BACKGROUND OF THE INVENTION

A speakerphone functions as a "hands-free" telephone wherein a loudspeaker and a microphone perform the typical handset functions of transmitting and receiving speech signals. As a result, the close proximity of a user to the phone is not required.

One problem associated with speakerphones is related to a noise component which results from acoustic coupling between the loudspeaker and the microphone. This undesirable acoustic coupling is commonly known as "room echo". The room echo noise component results from both direct and reflected sound paths from the loudspeaker to the microphone and, unless suppressed, the room echo noise component is audible to the caller. A second echo path, the trunk echo, exists at the near-end analog hybrid coupling device and is caused by an inherent impedance mismatch between the coupling device and the line. The overall effect of these echo noise components is to create a signal loop having positive gain. In order to avoid loop oscillations, the echo noise components must be suppressed or cancelled.

More specifically, the room echo noise component may be represented as the overall linear transfer function from the loudspeaker to to the microphone. The shape and duration of this transfer function are determined in part by the physical structure of the speakerphone, especially the relative positions of the microphone and the loudspeaker, and also by the dimensions, content and sound absorption properties of the room wherein the speakerphone is located. For example, the reverberation time of a typical office is approximately 330 milliseconds. Reverberation time is generally defined as the time required for the echo to decay to −60 dB or less.

One conventional approach to reducing room echo signal components is to require that the microphone and loudspeaker be physically separated by placing them in separate enclosures. Another conventional approach is to require an operator to speak into a handset while simultaneously inputting the speech through the microphone. In that the handset generated speech signal is, ideally, free of room echo components, circuitry with the speakerphone is enabled to identify and compensate for the echo component of the audio signal. Obviously, neither of these conventional approaches represents an optimum solution.

The trunk echo is the sum of all signal reflections due to the impedance mismatch in any two-to-four wire conversion hybrid circuits along the connection path. The strongest reflection occurs at the CBX connection to the trunk and is typically referred to as the near-end hybrid echo. This trunk echo component has a typical duration, including some delay, of 16 milliseconds. A far-end hybrid echo may also exist.

Trunk echoes of relatively long delay time are usually suppressed within the telephone network by Via Net Loss (VNL) and/or echo suppression/cancellation methods. However, domestic terrestrial trunks of up to 1850 airline miles in length are not required to include suppressors and may produce echo delays averaging as much as 35 milliseconds.

In a half-duplex speakerphone, the undesirable effects of such room and trunk echoes may be avoided by enabling only the transmit or the receive signal path at any given time. The signal path control mechanism is typically some form of a voice-operated switch. However, due to the finite switching time between the signal paths a user of a conventional half-duplex speakerphone may experience a degradation of interactive conversation, a limited ability to interrupt the talking party and a clipping of first syllables.

A full-duplex speakerphone ideally provides simultaneous bidirectional conversation and thus does not experience those problems related to signal path switching which occur in a half-duplex speakerphone. Typically an attempt is made to cancel both room and trunk echoes by employing adaptive filter techniques. For example, the signal which is coupled to the loudspeaker is also coupled through an adaptive filter and is thereafter subtracted from the microphone input signal. Ideally the adaptive filter is designed to minimize the difference between the microphone input signal and the output of the adaptive filter. Thus, in the ideal case, any non-echo signal is coupled through the speakerphone while the echo signal component is cancelled.

However, conventional full-duplex speakerphones do not operate in accordance with these ideal characteristics. Conventional full-duplex speakerphones exhibit problems related to the time required to initialize, or adapt, the adaptive filters. Furthermore, in a digital full-duplex speakerphone, error signals related to either A-Law or Mu-Law quantization and linearity errors cause a degradation in performance.

SUMMARY OF THE INVENTION

The foregoing and other problems are overcome by a full-duplex speakerphone constructed and operated in accordance with the invention. In an illustrative embodiment of the invention a full-duplex digital speakerphone includes a transmit signal path having an output coupled to a communication link, such as a telephone trunk, and a receive signal path having an input coupled to the communication link and an output coupled to a loudspeaker. The speakerphone further includes a room echo cancellation adaptive filter and a trunk echo cancellation adaptive filter. Serially coupled within the transmit signal path is a selective suppression block for suppressing a component of a Mu-Law or an A-Law quantization error signal. A second selective suppression block is serially coupled within the receive signal path.

The error signal may be non-zero due to either residual echo or actual, non-echo, speech. If the adaptive filter is adapted, and in the absence of non-echo signals, the error signal will be equal to a small number of Mu-Law (or A-Law) quantization steps and is due primarily to filter mistracking. By comparing the error signal to a current quantization step size associated with the microphone input signal, the signal is suppressed to zero if it is less than a predetermined number of quantization steps. Conversely, whenever a non-echo signal is present the error signal contains the mistracking component plus the non-echo signal. In such case the error exceeds the above described quantity, and therefore is not suppressed.

That is, the selective suppression blocks operate as threshold circuits, each having an output equal to zero if the absolute value of its input is less than or equal to a predetermined threshold. Otherwise, the output of a selective suppression block equals the input. The threshold value is changed dynamically to be proportional to the current Mu-Law or A-Law quantization step size associated with the input signal. Suppression of non-linearities due to Mu-Law or A-Law signal conversion is also accommodated by providing a non-linear signal processing block at an input to an adaptive filter and an optional non-linear signal processing block at an output of the adaptive filter. Each of the blocks emulates and compensates for signal converter non-linearity.

Further in accordance with the invention there is disclosed a full-duplex speakerphone wherein adaptive filter coefficient initialization is facilitated by beginning a call in a half-duplex mode and switching to full-duplex when the coefficients are adapted. The speakerphone of the invention furthermore has a variable adaptation step size which is a function of a short-term estimate of signal power within the associated transmit or receive signal paths.

BRIEF DESCRIPTION OF THE DRAWING

The foregoing aspects of the invention will be made more apparent in the following Detailed Description of the Invention when read in conjunction with the accompanying Drawing, wherein:

FIG. 5b is a simplified block diagram of one of the adaptive filter blocks of FIG. 5a.

DETAILED DESCRIPTION OF THE INVENTION

Figure 1:
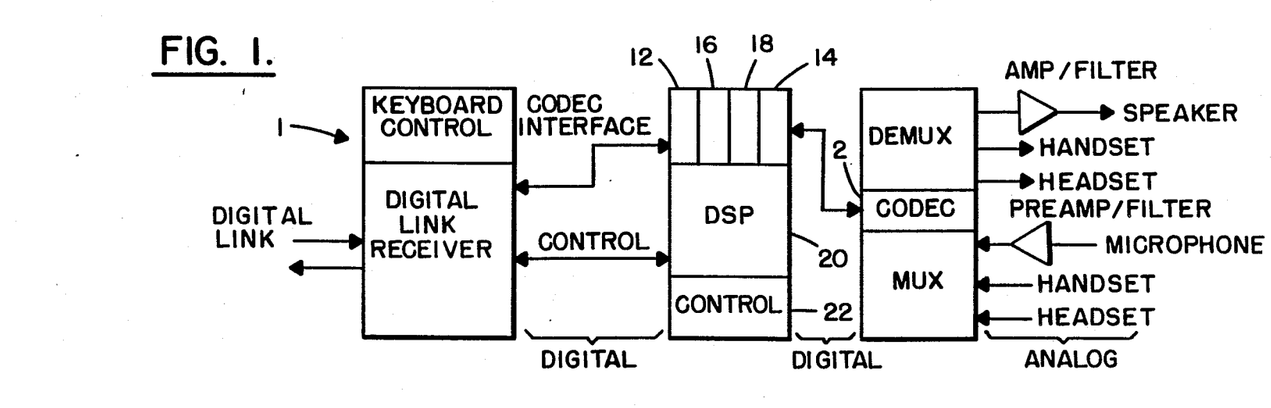
FIG. 1 is a block diagram of a full-duplex digital speakerphone of the invention.

Referring now to FIG. 1 there is shown a block diagram of a Full-Duplex Digital Speakerphone 10 which will be referred to herein as a speakerphone 10. The speakerphone 10 is interconnected between a digital link transceiver and a CODEC. The speakerphone 10 includes voice channel interface 12 on the link side, a voice channel interface 14 on the CODEC side, Mu/A-law to linear and linear to Mu/A-law convertors 16 and 18, a digital signal processor (DSP) 20 which controls adaptive filters and general control and timing circuits 22.

The following is a general description of data flow through the speakerphone 10. In the downlink direction, voice information is demultiplexed from the link by the digital link transceiver and is coupled to the speakerphone 10 through a serial communications port. The voice data is in the format of 8-bit bytes, encoded using one of two approximately logarithmic scales known in the art as either Mu-Law or A-Law. Inasmuch as the calculations performed by DSP 20 require the signals to be in a linear scale, a log-to-linear conversion of the incoming signal is performed. Within the DSP 20 the signal is processed and adaptively filtered as will be described in detail below. The signal is thereafter converted back to the appropriate logarithmic scale and input to the CODEC for conversion into an analog signal. This analog signal is thereafter input to a loudspeaker. The uplink path is similar to that described above but in a generally reversed order.

Figure 2:
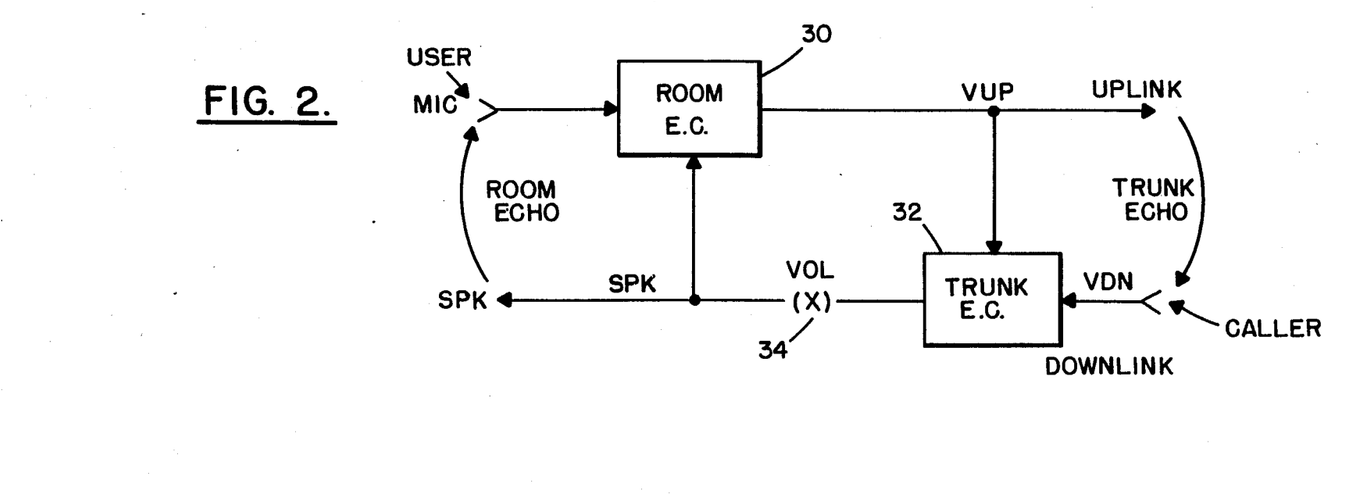
FIG. 2 is a simplified block diagram which illustrates room and trunk echo cancellation adaptive filters.

Referring to FIG. 2 it can be seen that the uplink and downlink signals contain echo noise components as has been previously described. The reverberation time of the room echo is generally defined as the amount of time required for the echo to decay to −60 dB or less. However, as a result of inherent Mu-Law or A-Law quantization noise it is generally necessary to cancel the echo only down to the −40 dB level. Thus the effective duration of the room echo is approximately 200 msec, or 1600 samples at an eight KHz audio sampling rate.

Two adaptive filters, one being a Room Echo Canceller (Room EC) 30 and the other being a Trunk EC 32, are shown coupled between the uplink and downlink signal paths. One suitable adaptive filter implementation is known as a Finite Impulse Response (FIR) filter, using a Least Means Squares (LMS) adaptation criteria. Advantages of this technique include a minimum number of computations, filter stability, convergence towards an optimum point in that there are no local minima and relatively simple implementation. The EC 30 and EC 32 of the invention are implemented as FIR filters and employ LMS adaptation criteria. Of course, other suitable filter types and adaptation criteria may be used.

The following is a discussion of certain variables and other parameters related to the physical implementation of adaptive filters EC 30 and EC 32 of the invention. The discussion is made in reference to the simplified block diagram of an adaptive filter shown in FIG. 3.

Figure 3:
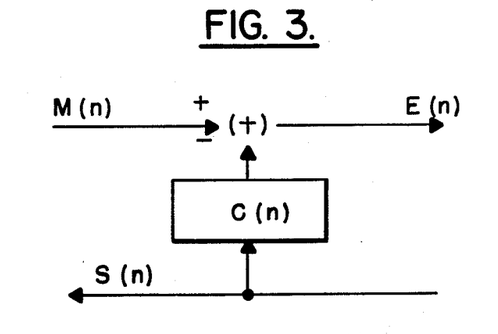
FIG. 3 is a simplified block diagram of an adaptive filter, the Figure being useful in gaining an understanding of certain mathematic equations.

The filter length, or order, is determined by the duration of the echo to be cancelled. In accordance with the foregoing description of the room and trunk echo characteristics a suitable filter length of the Room EC Filter 30 has been found to be 1536 coefficients (192 msec.), while the filter length of the Trunk EC Filter 32 has been found to be 256 Coefficients (32 msec.).

If it is assumed that the adaptive filter processes speech sampled at eight KHz and companded using Mu-Law or A-Law methods a 14-bit linear representation of the speech samples in the filter taps is required. However, it has been found that greater processing flexibility is achieved if 16 bits are employed to linearly represent the speech samples.

The coefficient word size is such that echo cancellation performance is not limited by coefficient quantization noise. It has been determined that a 24-bit coefficient word length is suitable.

Unless otherwise noted, in the ensuing description all 16-bit integer number values are considered signed fractionals, which implies that the absolute values represented are less than or equal to unity. The integer range is −32768 to +32767. The corresponding real values are −1.0 to +0.9999695. This representation scheme is known in the art as "Q15". A 16 by 16 bit multiplier/32 bit accumulator is employed for executing certain of the calculations while a 24 by 16 multiplier and a 40 bit accumulator are used for most control-related calculations. Final 32-bit results are rounded, not truncated, to 16 bits and overflow is avoided during accumulation. If an overflow condition is detected, the accumulator "saturates" at the maximum value as opposed to attenuating the input as is the case in some conventional systems. The adaptive filters 30 and 32 employ a 24 by 16 multiplier and a 40 bit accumulator. In that the adaptive filter output is a 16-bit value whereas the voice samples are 14 bit values, the adaptive filter output is limited to a 14 bit value, similar to an analog saturation effect. In general, the speech sample absolute value does not exceed 0.25, or an integer value of 8192. Due to the Q15 representation used for most calculations the multiplier output contains one redundant sign bit and, therefore, is equal to half the real value of the result. Thus, it is necessary to double the multiplier/accumulator output. A multiply by two operation is not performed by a left shift in that overflow could result. Preferably, a 32-bit number is added to itself and the result is saturated if necessary.

The determined value of the filter adaptation step size, or BETA, is determined with regard for desired filter coefficient convergence speed and an acceptable amount of fluctuation of the filter coefficients around an optimal value. An optimal BETA value is inversely proportional to the signal power. However, since speech signals are highly non-stationary, the BETA value employed by the invention is dynamically modified to be inversely proportional to a short-term estimate of the signal power. In the case of the trunk EC 32 a low-pass filtering of the square of the signal is an adequate estimate. The filter time-constant is on the order of the filter length, or approximately 16 milliseconds. In the case of the Room EC 30, since the filter length is much larger than the typical stationary period of speech, or 20-30 milliseconds, the filter taps contain a "history" of different speech levels. The value of BETA is therefore proportional to the maximum power level within the EC 30. This is accomplished by replacing the low-pass filter with a non-linear filter having a fast rise-time and a slow fall-time. The rise-time is preferably short enough to follow the signal's power peaks, approximately eight milliseconds, while the fall-time is a function of the filter length, approximately 128 milliseconds.

The coefficient update equation, equation 2 below, includes an optional leakage term the purpose of which is to reduce coefficient drift by slowly varying the coefficient value towards zero.

In order to prevent the filter coefficients from diverging away from the optimum point, adaptation is disabled in the absence of the corresponding signal. That is, room EC adaptation is disabled in the absence of caller speech and trunk EC adaptation is disabled in the absence of user speech.

A control block (Control 60 of FIG. 5a) determines a state of the speakerphone 10 to be in a User speech state, in a Caller speech state, in an Idle state or in an "Other" state. Filter adaptation is controlled accordingly. This feature of the invention will be described in further detail below. It should be noted that whenever the phone state is unknown, or classified as "Other", adaptation of both adaptive filters is enabled. Thus, possible "deadlock" states are avoided.

A DC offset in the echo path cannot be readily cancelled by an adaptive filter and the presence of the DC offset may cause large fluctuations in the adaptive filter coefficients. In accordance with one aspect of the invention DC offset in the echo path is removed by an adaptive DC coefficient. The adaptation equation is the same as for non-DC components except that the corresponding tap value is set to unity and the step size BETA is made smaller. In that the DC offset value is generally relatively small an increased filter accuracy is required to smoothly track the DC offset. Thus, the DC offset coefficient is preferably expressed as a 32-bit word. Alternatively, DC offset may be removed by digital high-pass filtering.

In many conventional full-duplex speakerphones volume control is performed externally. This presents a problem in that the reflected trunk echo is also affected by the volume adjustment and can easily be amplified beyond the clipping level, causing strong non-linear components which cannot be cancelled by an adaptive filter. In addition, a volume change requires filter readaptation in that the the effective trunk echo response is changed.

Figure 5A:
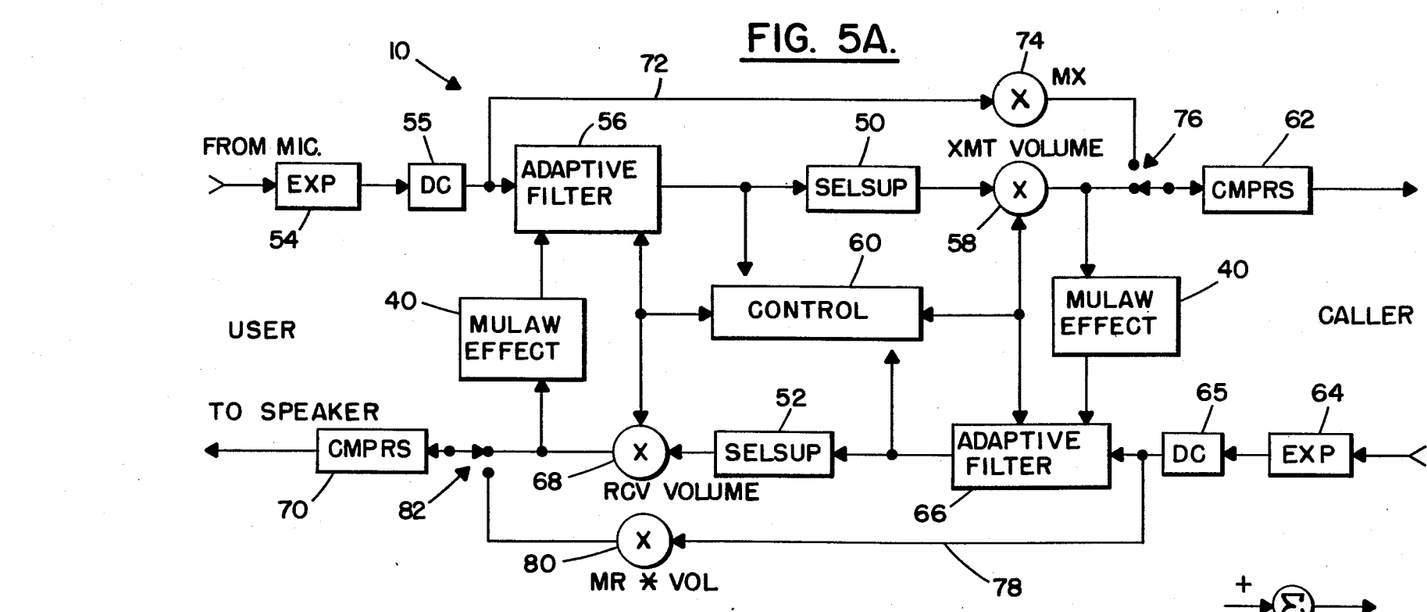
FIG. 5a is a block diagram of transmit and receive signal paths each having a Selective Suppression signal block and a volume adjusting signal block, each of the signal paths having an associated half-duplex signal path.

In order to overcome the above problems the speakerphone 10 of the invention provides for the volume control 34 to be taken outside of the trunk echo loop, as shown in FIGS. 2 and 5a. The DSP 20 executes the volume control function for a volume control range of +12 dB to −24 dB with a resolution of 1 dB per step.

Based on the above description of the speakerphone 10 of the invention the adaptive filter calculations executed by the DSP 20 will now be described. The various terms appearing in the equations and in FIG. 2 and FIG. 3 are as follows:

| | |
|---|---|
| S(n) | adaptive filter input, |
| M(n) | reference input, (signal with echo) |
| E(n) | filter error signal, |
| C(n) | filter coefficients, |
| As(n) | amplitude estimate of the input signal, |
| N + 1 | filter length, |
| BETA | adaptation step size, |
| BETA0 | a constant, |
| Ps | estimate of S(n) signal power, |
| Leak | leakage constant, |
| Tr, Tf | non-linear filter rise-time and fall-time constants, |
| sgn(.) | represents the signum function, |
| abs(.) | represents the absolute value function, and |

Limit 14 [.] is a limiter to 14 bits, the maximum voice sample value.

FILTER CALCULATIONS $$E(n) = M(n) - \text{Limit } 14 \sum_{i=0}^{14} S(i)^*C(n-i) \quad (1)$$

COEFFICIENT ADAPTATION:

new $C(k)$=old
$C(k)+\text{Beta}^*E(n)^*S(n-k)-sgn(C(k))^*\text{Leak}$ \quad (2)

wherein k=0 ... n

STEP SIZE MODIFICATION:

BETA=BETA0/Ps(n) \quad (3)

SIGNAL POWER ESTIMATE:

$$Ps(n) = As(n) * As(n) \quad (4)$$

As(n) CALCULATIONS (non-linear IIR filter):

if $As(n-1) > abs(S(n))$
then $$As(n) = As(n-1)*(1-Tr) + Tf*abs(S(n))$$

else $$As(n) = As(n-1)*(1-Tr) + Tr*abs(S(n)).$$

In order to determine the phone state (Caller, User, Idle, Other), a control function implemented by DSP 20 first calculates estimates of both speech and noise signal amplitudes for both the transmit and receive channels. Six variables are calculated, as defined below:

Sx = Transmit Channel total signal amplitude estimate,
Sr = Receive Channel total signal amplitude estimate,
Nx = Transmit Channel Noise amplitude estimate,
Nr = Receive Channel Noise amplitude estimate,
SPx = Transmit Channel Speech signal amplitude estimate, and
SPr = Receive Channel Speech signal amplitude estimate.

The above six variables are derived from the transmit and receive signals prior to the selective suppression and volume control blocks shown in FIG. 5a.

Sx and Sr are calculated by low-pass filtering the absolute value of the corresponding input signal, according to the equations:

$$Sx(n) = Sx(n-1)*TAU + (1-TAU)*abs(X(n)), \text{ and}$$

$$Sr(n) = Sr(n-1)*TAU + (1-TAU)*abs(R(n))$$

where abs(.) is an absolute value function and TAU is a time constant associated with the low-pass filter. A suitable value for TAU corresponds to a time constant of 32 milliseconds, which is similar to the average stationary period of speech.

Nx and Nr are calculated by a non-linear method which essentially detects and follows the minima points of the signal estimates Sx and Sr, respectively. The underlying assumption is that the minima points correspond to periods of time such as pauses between words, when the background noise is the only available signal.

The calculation is as follows:

If $Nx(n-1) > Sx(n)$ then $Nx(n) = Sx(n)$
otherwise $Nx(n) = Nx(n-1) + \text{Incr}.$ Similarly, If $Nr(n-1) > Sr(n)$ then $Nr(n) = Sr(N)$
otherwise $Nr(n) = Nr(n-1) + \text{Incr}.$ Incr is a small increment value that allows initial filter convergence towards a typical noise level within approximately one to two seconds.

SPx and SPr are speech level estimates and are derived by subtracting the corresponding noise from the signal estimate:

$$SPx = Sx - Nx, \text{ and}$$

$$SPr = Sr - Nr.$$

Based on the above described six variables, four binary variables are calculated as follows:

b3 = 1 if $K1*Sx - Nx - K2 > 0$, otherwise b3 = 0, b2 = 1 if $K1*Sr - Nr - K2 > 0$, otherwise b2 = 0, b1 = 1 if $Spx*VOLx > K3*SPr$, otherwise b1 = 0, and
b0 = 1 if $SPr*VOLr > K3*SPx$, otherwise b0 = 0.

b3 and b2 indicate the presence or absence of speech in the transmit and receive path, respectively, whereas b1 and b0 indicate the relative strength of the transmit versus the receive speech signal. K1 and K2 are constants which define the threshold above which the signal is considered to be speech. K3 defines the ratio of transmit and receive speech levels required to distinguish between User and Caller states. A typical value for K3 is approximately three to four. VOLx and VOLr are the transmit and receive volume levels, respectively, and include both user-selected volume and additional attenuation which may optionally be added, as explained below.

Based on the above binary variables, the phone state is determined periodically, such as once every 8 samples, according to the following table, where X indicates a "don't care" (either 0 or 1):

| b3 | b2 | b1 | b0 | PHONE STATE | ENABLE ROOM FILTER ADAPTATION | ENABLE TRUNK FILTER ADAPTATION |
|---|---|---|---|---|---|---|
| 0 | 0 | X | X | IDLE | NO | NO |
| X | 1 | 0 | 1 | CALLER | YES | NO |
| 1 | X | 1 | 0 | USER | NO | YES |
| 0 | 1 | 1 | X | illegal | NO | NO |
| 1 | 0 | X | 1 | illegal | NO | NO |
| 1 | 1 | 1 | 1 | illegal | NO | NO |
| all else | | | | OTHER | YES | YES |

The three illegal states shown above result from the fact that the four binary variables are inter-correlated, and therefore some combinations can never occur.

The purpose of determining the phone state is twofold. Firstly, the adaptation process of the two adaptive filters 30 and 32 is enabled or disabled according to the phone states by a method which optimizes performance and minimizes filter divergence. Secondly, in order to further improve the signal-to-echo ratio, some amount of attenuation may be inserted in the non-active path during the User and Caller states. For example, when in the USER state the receive path may be attenuated slightly. Thus, the performance is improved without degradation of the full-duplex nature of the speakerphone 10. In addition, the inserted attenuation assures negative loop gain and thereby prevents oscillations within the loop defined by the two back-to-back adaptive filters 30 and 32.

Control 60 initializes the adaptive filter coefficients to zero prior to each call in that the echo characteristics generally change from call to call. Initializing the coefficients to zero is also advantageous in that non-zero coefficients may cause an overflow during the filter calculations and, consequently, result in filter divergence.

In that all coefficients are initially set to zero, echoes are not initially cancelled during a call and the signal loop begins to oscillate. In some conventional echo-cancelling applications the initial adaptation problem is solved by means of a training period in which a known signal, such as random noise, is transmitted. Since a similar solution is not generally applicable to a speakerphone, the invention further provides for a combined Half/Full Duplex speakerphone. That is, the phone operates as a half-duplex speakerphone until the EC 30 and EC 32 have achieved an initial adaptation. Thereafter, automatic switching to full-duplex is accomplished.

This Half/Full Duplex switching is controlled by Control 60 and, in general, is achieved by uncoupling the output of the full-duplex signal paths from the output signal compressors. Thus, in the Half-Duplex mode EC 30 and EC 32 receive an input and adapt their coefficients based on the magnitude of the room echo and the trunk echo, respectively, without having their outputs applied to the output signal paths. When Control 60 determines that adaptation is achieved the full-duplex signal paths are applied and Full-Duplex operation is initiated. This aspect of the invention will be described in greater detail below.

In order to reach an acceptable level of adaptation, an adaptive filter requires a certain amount of signal energy to pass through it. That is, a certain minimum signal power level over a certain minimum period of time must be input to the EC filters 30 and 32.

In accordance with this aspect of the invention during the beginning of a call the speakerphone is operated in the half-duplex mode. Control 60 measures and accumulates the net time in which each signal is larger than a predetermined threshold. After a net time of approximately three seconds of speech in both the transmit and receive directions has been accumulated the speakerphone 10 is switched to the full-duplex mode. It should be noted that the actual time may be 10–20 seconds, depending on the amount of pauses in between words and also on the duration of idle intervals when no speech is present.

While in the Half-Duplex Mode of operation Control 60 controls the operation of the speakerphone 10 to insert considerable loss in one path while enabling signal transmission in the other path. One suitable Half-Duplex implementation is described in U.S. patent application Ser. No. 07/256,610, filed Oct. 12, 1988, entitled "Half-Duplex Speakerphone", in the name of Y. Arbel and assigned to the assignee of this invention In that an adaptive filter, after adaptation, is a linear system only linear components of the signal echo are cancelled. Non-linear signals within the echo path cannot be adaptively cancelled, except for the above mentioned DC bias. Hence a Signal-to-Echo ratio (SER) may not exceed the signal-to-total harmonic distortion ratio of the echo path. Some non-linearities, such as analog amplifier saturation, loudspeaker/microphone saturation, non-linear loading of signals and DC bias are preferably minimized by attention to these factors during design.

As has been stated, each adaptive filter coefficient corresponds to a discrete echo delay. The adaptation process updates the coefficient by a value proportional to the correlation between the error signal and the adaptive filter input. Therefore, in order to capture the echo path impulse response the transmitted signal is preferably a wide-band, un-correlated signal such as speech or random noise. If the signal is correlated, such as a tone, the adaptive filter coefficients tend to converge towards a special solution which cancels the signal, but which is not the desired echo path impulse response. Consequently, dial-tone and ring-back signals are preferably avoided. This may be accomplished by, in accordance with the invention, employing the half-duplex mode at the beginning of a call. Dial-tone and ring-back signals may also be avoided by disabling the filter adaptation when narrow-band signals are detected.

That is, in that correct initial adaptation requires wideband signals such as speech or random noise, initial filter adaptation in the presence of pure tones may cause filter divergence. Whenever the user initiates a call by dialling, such pure tones are present during the first few seconds of establishing the call. These tones include the dial tone, any DTMF or other tones generated in response to pressing the dialing keys and, finally, the ring-back signal.

One preferred method of avoiding initial adaptation during the period of establishing the call is based on the "square wave" nature of the receive signal path signal envelope during the initial period. The square wave signal represents a small, predictable number of tone related toggles between high and low levels of signal during the dialing period, whereas speech signals contain much more variability in amplitude.

Based on the predictable square wave nature of the initial dialing period, a certain number of receive signal toggles, such as 20, must be detected by control 60 before filter adaptation is enabled. Thus, filter initial adaptation is not affected by the dialing process. In the case when the user receives a call, that is no dialling is performed, the above method produces only a small delay, because of the dynamic nature of speech, which contains many such toggles per second.

One major non-linearity within the echo path is related to either A-Law or Mu-Law companding. In that the 14-bit linear PCM sample is converted to an 8-bit Mu-Law or A-Law sample according to a logarithmic curve the resulting quantization noise limits the system SNR and SER to approximately 35 dB.

Due to this non-linearity as well as to other factors such as noise, the amount of echo cancellation is preferably limited to a SER of approximately 30 dB. Although the loop gain for echoes is approximately $-60$ dB, the half-loop echo attenuation is only approximately 30 dB. It should be noted that a 14-bit PCM voice signal has a dynamic range of over 70 dB.

The divergence of adaptive filter coefficients may occur due to large overflow or saturation in the convolution or sum of products calculations. An incorrect error term is thus fed back and used to update the coefficients, resulting in the creation of a positive-feedback loop. Consequently, the adaptive filter output will oscillate at full-scale signal. In that the two back-to-back adaptive filters create such a feed-back loop, the system may latch-up at full-scale signal oscillation. Although divergence is unlikely under normal circumstances accidental events, such as power surges, may trigger divergence by corrupting the coefficient/tap data in an adaptive filter memory.

This particular problem cannot be totally avoided. However, the speakerphone 10 of the invention minimizes the effect of divergence by immediately initializing the system if a diverging condition is detected. Detection is readily achieved by Control 60 in that divergence is characterized by a full-scale, stationary signal, which is highly improbable during normal speech. Speech normally contains only short durations of full-scale signal.

In accordance with one aspect of the invention divergence detection is achieved by, during a predetermined continuous period of time, such as 250 msec, identifying a signal power which exceeds a predetermined threshold. It has been found that a suitable threshold is one half of the full-scale signal power.

In one adaptive filter coefficient block update method adaptive filter coefficients are not updated every sample time. Each coefficient is updated, for example, once every eight samples. The update increment value is the sum of the eight most recent increments as calculated by a continuous update method. Advantages of the block update method are a reduced number of calculations and an improved resolution of the coefficient increment, since the accumulation is done in a 32 or 40 bit accumulator.

As was previously mentioned the A-Law or Mu-Law quantization produces a SNR of approximately 30–36 dB, thereby limiting adaptive filter performance (SER) to approximately 30 dB. One reason for this limitation is that the quantization is a non-linear operation and therefore produces a non-linear signal component which cannot be cancelled by the adaptive filter. However, since the A-Law and the Mu-Law functions are known, the resulting non-linear effect may be artificially added to the synthetic echo generated by the adaptive filter.

Figure 4:
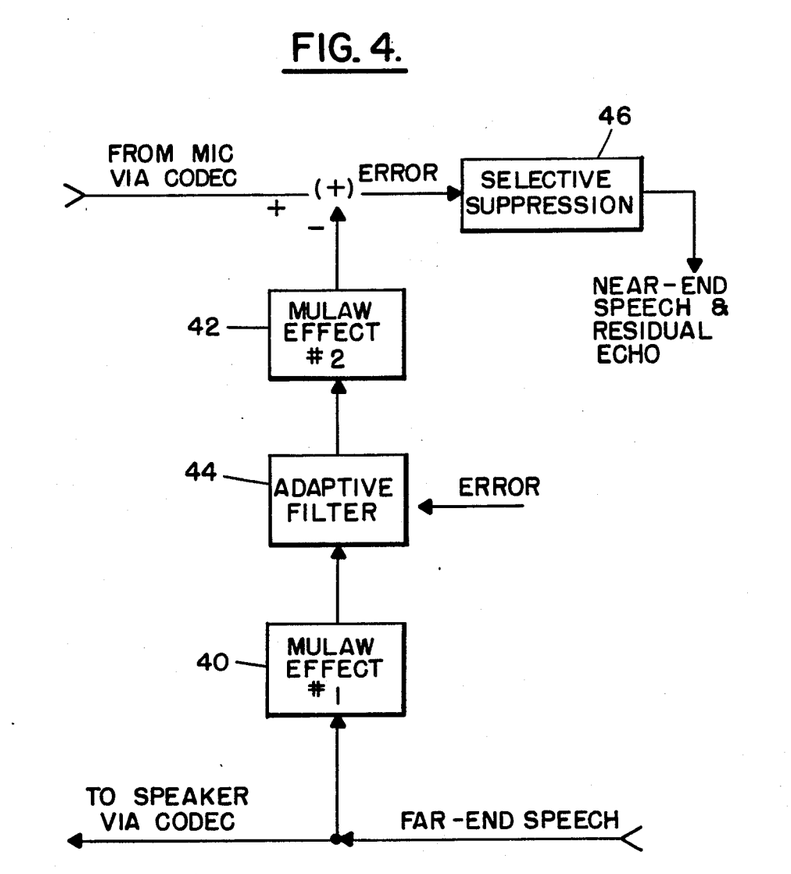
FIG. 4 is a block diagram of a portion of the digital full duplex speakerphone of the invention, the Figure showing two Mu Law Effect Blocks coupled to an input and an output of an adaptive filter, the Figure also illustrating a Selective Suppression signal block which is another aspect of the invention.

In accordance with another aspect of the invention, and as shown in FIG. 4, two Mu-Law effect blocks are added to the adaptive filter signal path. The block MULAW EFFECT #1 40 emulates the effect of compressing the digital linear signal prior to Digital-to-Analog conversion within the CODEC. The MULAW EFFECT #2 42 block similarly emulates the compression/expansion that takes place in the path from the microphone to the CODEC and to the DSP processor 20. Thus the nonlinear Mu-Law effect is reproduced in the adaptive filter 44 path. Of course, blocks 40 and 42 may compensate instead for A-Law non-linearities.

Ideally, adding the two Mu-Law effect blocks 40 and 42 would improve the SER from 30 to 50 dB. However, small deviations from ideal linearity in the echo path result in a SER improvement of from approximately 30 to 33 dB. One reason for this less than ideal improvement is that, due to the Mu-Law quantization, even small differences between the actual echo and synthetic echo may cause a full quantization step difference. Such small differences always exist due to the stochastic nature of the coefficient convergence, as well as due to noise and other non-ideal conditions.

Also in accordance with the invention the SER can be improved still further by selectively suppressing the error signal as explained below.

In general, the error signal may be non-zero due to either residual echo or actual, non-echo, speech. If the adaptive filter is reasonably adapted, and in the absence of non-echo signals, the error signal is equal to a small number of Mu-Law (or A-Law) quantization steps, and is due primarily to filter mistracking. By comparing the error signal to the current quantization step size associated with the microphone input signal, the signal is suppressed to zero if it is less than a predetermined number of quantization steps.

Conversely, whenever a non-echo signal is present, the error signal contains the mistracking component plus the non-echo signal. In such cases the error exceeds the above described quantity, and therefore will not be suppressed.

Block 42, MU Law Effect #2, ensures that the error signal is an integer number of quantization steps, because it is a difference of two Mu-Law quantized signals. However, this technique described above operates as well without the error being an exact integer number of quantization steps. Therefore, MU Law Effect block 42 is not required for successful operation of the Selective Suppression Block 46.

It should be noted that due to the logarithmic scale of Mu/A Law the quantization steps size varies dynamically. The signal dynamic range is divided into eight segments. In each of the segments a different quantization step size is used. Generally, the Selective Suppression 46 function operates as a threshold circuit. Its output is zero if the absolute value of its input is less than or equal to a certain threshold. Otherwise, the output equals the input. The threshold value is changed dynamically to be proportional to the current Mu-Law quantization step size associated with the input signal. That is, the threshold may change from sample to sample.

In a near-ideal system in which the major distortion factor is the Mu-Law quantization, the residual echo amplitude is on the order of a single quantization step. Hence, by setting the threshold equal to one current quantization step, substantially all of the residual echo is eliminated.

Increasing the threshold to a multiple number of quantization steps or, similarly, to a larger fraction of the current input sample amplitude results in suppressing larger residual echoes resulting from larger adaptive filter mis-tracking. However, increasing the Selective Suppression 46 threshold introduces a possibility of cancelling larger non-echo signals as well.

Thus, the choice of the threshold is a trade-off between the ability to suppress larger residual echoes and the suppression of some non-echo signal. However, the undesired suppression of non-echo signals is minimized if the Selective Suppression 46 function is bypassed or disabled whenever simultaneous bidirectional speech or opposite direction speech is detected by Control 60.

It should be noted that the selective suppression function is inserted only within the audio path, whereas the coefficient adaptation is performed by employing the original error signal. This is preferable in that employing the suppressed signal would produce local minimas at coefficient values which correspond to some integer number of quantizations-steps of difference between echo and the synthetic echo.

Figure 5B:
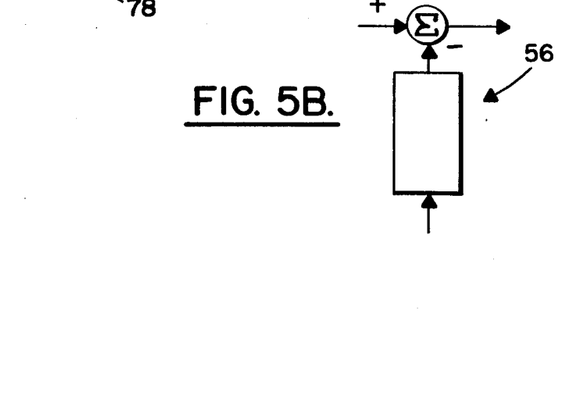

Referring now to FIG. 5a there is shown a block diagram of a speakerphone having a first Selective Suppression block 50 in the uplink signal path and a second Selective Suppression block 52 in the downlink signal path. In the uplink signal path an output of a microphone is expanded by Mu-Law expander 54. The linear output of expander 54 is applied to a DC block 44 which represents the aforementioned DC tap for DC removal. The output of DC block 55 is summed with the output of a Room EC adaptive filter 56 to produce an error signal which is applied to the Selective Suppression block 50. The Suppression block 50 operates as previously described to selectively suppress error samples. The output of Selective Suppression block 50 is applied to a volume control block 58 which is controlled by Control 60. The output of the uplink volume control 58 is converted to a logarithmic signal by Mu-Law compressor 62 and is thereafter coupled uplink. The downlink path is similar to that described above for the uplink path and includes a Mu-Law expander 64, DC block 65, a Trunk EC 66 and the aforementioned Selective Suppression block 52. The output of Selective Suppression block 52 is applied to a downlink volume control block 68 and is converted to a logarithmic signal by a Mu-Law compressor 70. The output of block 70 is applied to a loudspeaker (not shown). It should be noted that each of the adaptive filter echo cancellers, 56 and 66, may be depicted as shown in FIG. 5b. It should also be noted that adaptive filters 56 and 66 are both provided with a Mu-Law (A-Law) Effect block 57 and 67, respectively at their input. Mu-Law Effect blocks 57 and 67 operate as previously described to emulate the nonlinear effect of Mu-Law conversion.

Control 60 operates as previously stated to control the operation of the adaptive filters 56 and 66 and also controls the volume control blocks 58 and 68. Furthermore, the Control 60 places the speakerphone in a half-duplex mode of operation when a call is first initialized. Control 60 monitors the coefficient taps of adaptive filters 56 and 66 and switches to the full duplex mode when the filters are initialized.

The transmit half-duplex path is indicated by signal path 72 and includes a transmit variable gain element MX 74 and a switch means 76. MX 74 and switch 76 are controlled by Control 60. The receive half-duplex path is indicated by signal path 78, variable gain element MR*VOL 80 and switch means 82. These elements are similarly controlled by Control 60. Switches 76 and 82 are shown in the full-duplex position in FIG. 5a. However, at call initialization these switches are set to uncouple the output of the full duplex paths and to select the outputs of the half-duplex signal paths 72 and 78. The switching criterion between half-duplex and full-duplex has been previously described. As has been previously mentioned, a suitable mode of operation of the speakerphone 10 when in the half-duplex mode of operation is disclosed in U.S. patent application Ser. No. 07/256,610, filed Oct. 12, 1988.

Although the invention has been described in FIG. 5a in relation to Mu-Law conversion apparatus it should be realized that the teaching of the invention is equally applicable to A-Law conversion devices.

As has been previously stated, the speakerphone 10 control function is preferably implemented with a digital signal processor (DSP) integrated circuit. One suitable device is known as the TMS32020 DSP processor which is manufactured by Texas Instruments. Also, the adaptive filters 56 and 66 may each be implemented by integrated circuits. One suitable device to implement the adaptive filtering function is known as a DSP 56200 which is manufactured by Motorola Incorporated. It should be realized however that the concepts embodied in the present invention may be implemented by a number of suitable embodiments, such as by discrete analog and digital circuitry. Thus, the invention is not to be construed to be limited to only the embodiment disclosed above but is instead intended to be limited only as set forth in the claims which follow.

What is claimed is:

1. A speakerphone including a transmit signal path having an output coupled to a communications link, the speakerphone further including a receive signal path having an input coupled to the communications link and an output coupled to a loudspeaker means, the speakerphone comprising:

means for generating a transmit path signal, the transmit path signal including a first echo signal component;

means for converting the transmit path signal to a digital transmit signal expressed by a plurality of bits, the digital transmit signal including a first digital quantization error signal;

first adaptive filter means having an input coupled to the receive signal path and an output coupled to the transmit signal path for cancelling most of the first echo signal component;

means for coupling the receive signal path to the communications link and generating a receive path signal including a second echo signal component;

means for converting the receive path signal to a digital receive signal expressed by a plurality of bits, the digital receive signal including a second digital quantization error signal;

second adaptive filter means having an input coupled to the transmit signal path and an output coupled to the receive signal path for cancelling most of the second echo signal component;

the speakerphone further comprising first means for selectively suppressing the first digital quantization error signal, said first selective suppression means being serially coupled within the transmit signal path and having an input coupled to the transmit signal path at a point after the output of said first adaptive filter means; and second means for selectively suppressing the second digital quantization error signal, said second selective suppression means being serially coupled within the receive signal path and having an input coupled to the receive signal path at a point after the output of said second adaptive filter means.

2. A speakerphone as set forth in claim 1 wherein said transmit signal path converting means and said receive signal path converting means are each a Mu-Law converting means and wherein the first and the second selective suppression means each comprise threshold means responsive to a Mu-Law quantization step size employed by the associated Mu-Law converting means.

3. A speakerphone as set forth in claim 1 wherein said transmit signal path converting means and said receive signal path converting means are each an A-Law converting means and wherein the first and the second selective suppression means each comprise threshold means responsive to an A-Law quantization step size employed by the associated A-Law converting means.

4. A speakerphone as set forth in claim 2 and further comprising transmit signal path output Mu-Law conversion means for converting an output of the first selective suppression means to an analog signal, the speakerphone further comprising first Mu-Law Effect compensating means coupled between the receive signal path and the input to the first adaptive filter means for compensating for a nonlinear effect of the output Mu-Law conversion means.

5. A speakerphone as set forth in claim 4 and further comprising second Mu-Law compensating means coupled between the output of the first adaptive filter means and the transmit signal path for compensating for a nonlinear Mu-Law effect of the transmit signal path input converting means.

6. A speakerphone as set forth in claim 3 and further comprising transmit signal path output A-Law conversion means for converting an output of the second selective suppression means to an analog signal, the speakerphone further comprising first A-Law Effect compensating means coupled between the receive signal path and the input to the first adaptive filter means for compensating for a nonlinear effect of the output A-Law conversion means.

7. A speakerphone as set forth in claim 6 and further comprising second A-Law compensating means coupled between the output of the first adaptive filter means and the transmit signal path for compensating for a nonlinear A-Law effect of the transmit signal path input converting means.

8. A method of operating a speakerphone, the speakerphone comprising a first echo cancellation adaptive filter having an input coupled to a receive signal path and an output coupled to a transmit signal path, the speakerphone further comprising a second echo cancellation adaptive filter having an input coupled to the transmit signal path and an output coupled to the receive signal path, the method comprising the steps of:
converting a transmit signal path input signal to a digital representation of the transmit signal path input signal, the digital representation including the first echo noise component and also a first quantization error component;
converting a receive signal path input signal to a digital representation of the receive signal path input signal, the digital representation including the second echo noise component and also a second quantization error component;
cancelling at least a portion of the first echo noise component and the second echo noise component with the adaptive filters, the step of cancelling including the steps of, for each of the adaptive filters,
generating an adaptive filter output error signal $E(n)$ having a magnitude which is a function of the input signal, a reference input signal and a magnitude of adaptive filter coefficients; and
adapting the magnitude of the adaptive filter coefficients as a function of an adaptation step size Beta, wherein Beta is a function of a constant Beta0 which is divided by a signal power estimate $Ps(n)$, the step of cancelling further comprising the steps of,
suppressing the first quantization error component of the digital representation of the transmit signal path signal; and
suppressing the second quantization error component of the digital representation of the receive signal path signal.

9. A method as set forth in claim 8 wherein a magnitude of $Ps(n)$ is given by the function $$Ps(n) = As(n)*As(n)$$

wherein $As(n)$ is determined in accordance with the relationship if $As(n-1) > abs(S(n))$ then $$As(n) = As(n-1)*(1-Tf) + Tf*abs(S(n))$$

else $$As(n) = As(n-1)*(1-Tr) + Tr*abs(S(n))$$

where $As(n)$ is an amplitude estimate of the adaptive filter input signal, $abs(S(n))$ is an absolute value of the filter input, Tf is a fall-time of the filter, and Tr is a rise-time of the filter.

10. A method as set forth in claim 8 and further comprising a step of determining a state of the speakerphone to be a CALLER state, a USER state, an IDLE state or an OTHER state in accordance with the state of a plurality of binary variables.

11. A method as set forth in claim 10 wherein the plurality of binary variables are b0, b1, b2 and b3, wherein when b2 and b3 are both equal to zero the speakerphone is determined to be in the IDLE state, when b0 and b2 are both equal to one, the speakerphone is determined to be in the CALLER state and when b1 and b3 are both equal to one the speakerphone is determined to be in the USER state, and wherein the state of each of the binary variables is determined in accordance with the following relationships:

$b3 = 1$ if $K1*Sx - Nx - K2 > 0$, otherwise $b3 = 0$, $b2 = 1$ if $K1*Sr - Nr - K2 > 0$, otherwise $b2 = 0$, $b1 = 1$ if $SPx*VOLx > K3*SPr$, otherwise $b1 = 0$, and $b0 = 1$ if $SPr*VOLr > K3*SPx$, otherwise $b0 = 0$ where K1 and K2 are constants that define a threshold above which a signal is considered to be speech, K3 defines a ratio of transmit and receive speech levels to distinguish between the USER and the CALLER states, VOLx and VOLr are transmit and receive volume levels, respectively, and wherein Sx = Transmit Channel total signal amplitude estimate, Sr = Receive Channel total signal amplitude estimate, Nx = Transmit Channel Noise amplitude estimate, Nr = Receive Channel Noise amplitude estimate, SPx = Transmit Channel Speech signal amplitude estimate, and SPr = Receive Channel Speech signal amplitude estimate.

12. A method as set forth in claim 11 wherein for all other combinations of b0, b1, b2 and b3 except b1=1, b2=1, b3=0 and b0=1, b2=0, b3=1 and b0=b1=b2=b3=1 the speakerphone is determined to be in the OTHER state.

13. A method as set forth in claim 11 wherein VOLx and VOLr each varies within a range of approximately +12 dB to approximately −24 dB.

14. A method as set forth in claim 10 wherein when the speakerphone is determined to be in the CALLER state only the adaptation of the first echo cancellation filter is enabled, when the speakerphone is determined to be in the USER state only the adaptation of the second echo cancellation filter is enabled, when the speakerphone is determined to be in the IDLE state neither the adaptation of the first or the second echo cancellation filters are enabled and when the speakerphone is determined to be in the OTHER state the adaptation of both the first and the second echo cancellations filters are enabled.

15. A method as set forth in claim 8 wherein the steps of generating an output error signal and adapting are accomplished while operating the speakerphone in a half-duplex mode of operation when a call is first initiated.

16. A method as set forth in claim 15 and further comprising the steps of:
   determining a time when the magnitude of the filter coefficients have a value which indicates that the first echo cancellation adaptive filter and the second echo cancellation adaptive filter are initialized; and
   switching the speakerphone to a full-duplex mode of operation.

17. A method as set forth in claim 8 wherein the steps of suppressing are each accomplished by:
   comparing the output of each of the echo cancellation adaptive filters to a threshold to determine if the output has a component which is greater than or less than a current quantization step size; and
   if the output is determined to have a component which is less than a predetermined number of quantization steps further includes a step removing the component.

18. A method as set forth in claim 8 wherein the steps of suppressing each include a step of emulating a nonlinear effect associated with each of the steps of converting.

19. A method as set forth in claim 8 and further comprising a step of detecting a diverging condition within the adaptive filters, the step of detecting including a step of identifying a signal power which continuously exceeds a predetermined threshold value for a predetermined interval of time.

20. A method as set forth in claim 19 wherein the predetermined threshold value is approximately one half of a full scale signal power and wherein the predetermined interval of time is approximately 250 milliseconds.

21. A method as set forth in claim 20 and further comprising a step of reinitializing the adaptive filters when a diverging condition is detected.

22. A method as set forth in claim 8 wherein the steps of converting are accomplished in a repetitive manner at a rate related to a predetermined signal sample rate and wherein the step of adapting is accomplished at a rate which is less than the signal sample rate.

23. A method as set forth in claim 8 wherein the step of cancelling comprises the initial steps of, when a call is first initated;
   determining when a predetermined number of transitions of the receive signal path signal have occurred; and
   enabling the adaptation of adaptive filter coefficients.

24. In a speakerphone including a transmit signal path having an output coupled to a communications link, the speakerphone further including a receive signal path having an input coupled to the communications link and an output coupled to a loudspeaker means, a method of operating the speakerphone comprising the steps of:
   generating a transmit path signal, the transmit path signal including a first echo signal component;
   converting the transmit path signal to a digital transmit signal expressed by a plurality of bits, the digital transmit signal including a first digital quantization error signal;
   cancelling most of the first echo signal component by adaptively filtering the transmit path signal;
   generating a receive path signal, the receive path signal including a second echo signal component;
   converting the receive path signal to a digital receive signal expressed by a plurality of bits, the digital receive signal including a second digital quantization error signal;
   cancelling most of the second echo signal component by adaptively filtering the receive path signal;
   selectively suppressing the first digital quantization error signal with a first selective suppression means which is coupled to the transmit signal path; and
   selectively suppressing the second digital quantization error signal with a second selective suppression means which is coupled to the receive signal path.

25. A method as set forth in claim 24 wherein the steps of selectively suppressing each include a step of comparing the associated transmit or receive path signal to a threshold value related to a current value of a quantization step size.

* * * * *